Aug. 20, 1935.   G. J. THOMAS   2,011,783
BRAKE TESTING APPARATUS
Filed May 18, 1929
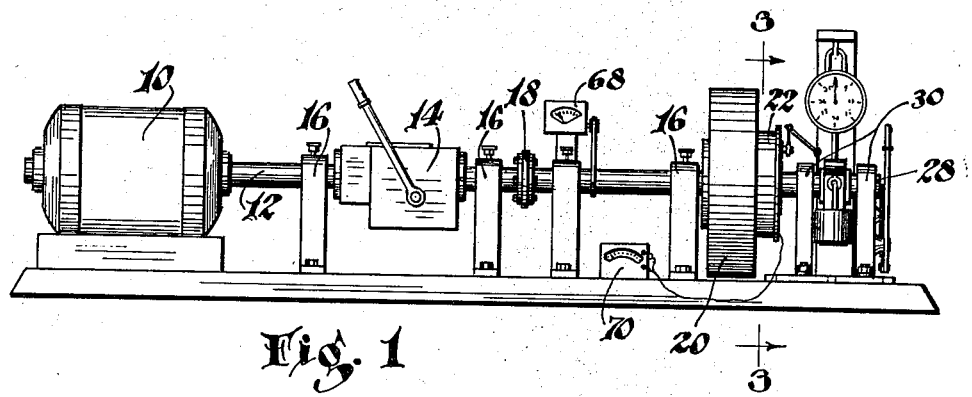
Fig. 1
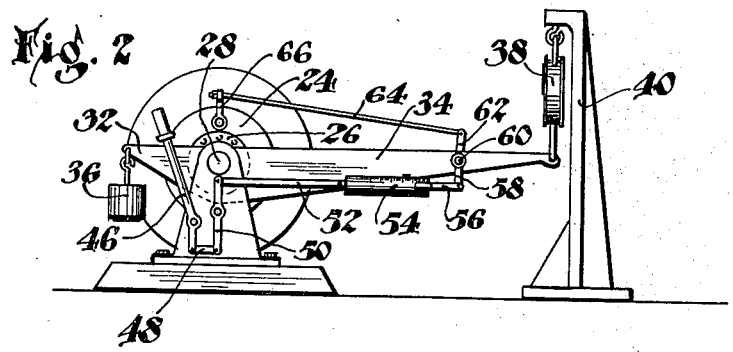
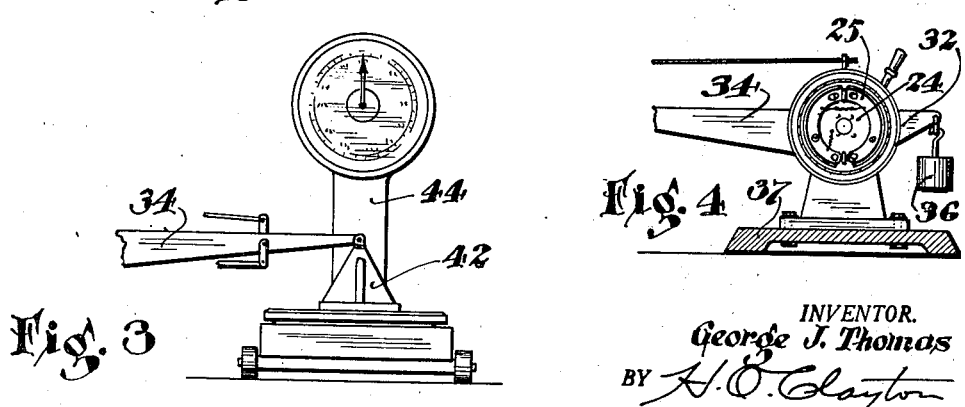
INVENTOR.
George J. Thomas
BY
ATTORNEY Patented Aug. 20, 1935

2,011,783

UNITED STATES PATENT OFFICE 2,011,783

BRAKE TESTING APPARATUS

George J. Thomas, Detroit, Mich., assignor to Bendix Brake Company, South Bend, Ind., a corporation of Illinois Application May 18, 1929, Serial No. 364,019

8 Claims. (Cl. 265—24)

This invention relates to apparatus in the nature of a friction dynamometer for determining the relative effectiveness of various types of automobile brakes and the lining on said brakes.

The apparatus comprises means for imparting angular motion to a member, developing in that member kinetic energy less than the energy of an automobile of average weight, the speed of which member is also variable to simulate the road speeds of the automobile. The rotatable member is provided with a brake drum detachably mounted thereon and within which is fitted a brake, the latter being mounted on a rotatable support having a beam member secured thereto, which member co-operates with a scale indicating means to determine the reaction of the brake upon its contact with the rotating drum. A compound lever linkage may in part be mounted upon the beam member on the aforementioned rotatable support, the same constituting operating means for the brake and including in its linkage an indicator for determining the brake-applying pressures.

Various other features of the invention, including the incorporation of various indicators in the apparatus, the specific details of construction and certain novel combinations of parts, will become apparent from the detailed description of the invention taken in conjunction with the drawing illustrating the same, in which:

Figure 1 is a side elevation illustrating diagrammatically the various parts of the testing apparatus;

Figure 2 is an end elevation of the apparatus showing in more detail the mechanism for indicating the reaction of the brake;

Figure 3 is a view similar to Figure 2 showing a modified form of pressure indicator; and Figure 4 is a vertical section taken on the line 3—3 of Figure 1 showing a brake unit mounted on its rotatable support.

As disclosed in Figure 1, a motor 10, or equivalent power source, may be employed to rotate a drive shaft 12, the R. P. M. of which is preferably controlled by a suitable change speed transmission device 14. Bearing supports 16 are spaced at suitable points in the length of the shaft and a flexible coupling 18 may also be incorporated to compensate for irregularities in the shaft alignment. A fly-wheel 20 constructed to receive various sized brake drums 22 detachably secured thereto, is secured to the end of the drive shaft, the mass thereof being made equal to one-fourth of the mass of an average pleasure car. The mechanism thus described effectively simulates one of the four wheels of a moving automotive vehicle, the R. P. M. of the shaft being predetermined to build up the desired kinetic energy of the rotating fly-wheel mass.

In order to determine the relative effectiveness of various types of brakes and brake linings, I have provided a testing mechanism comprising, in general, a rotatable brake support, in combination with suitable indicating means. The rotatable support may comprise a circular backing plate 24 positioned at the open end of the drum, the brake unit 25 to be tested being mounted thereon through the medium of the usual anchor pins, stops, etc., all as clearly indicated in Figure 4.

Plate 24 is preferably detachably mounted on a flange 26 projecting laterally from one end of a solid shaft 28 journaled in bearing supports 30 formed on a base slidingly and adjustably mounted on base 37. Shaft 28 is provided, intermediate the supports 30, with a rigid beam comprising short and long arms 32 and 34, respectively, and which beam is in equilibrium, the short arm 32 being weighted by a mass 36 to counter-balance the weight of the longer arm. The long arm 34 of the beam may be either pivotally connected to a spring scale indicator 38 supported by a standard 40, or it may disconnectedly engage a yoke member 42 acting as a thrust member upon platform scales 44, as indicated in Figure 3.

Power transmission linkage for actuating the brake may be supported in part by one of the supports 30 and preferably comprises a bell crank 46 pivotally connected by a thrust link 48 to a lever 50 pivoted to the support 30. Lever 50 is in turn pivoted to thrust link 52, the latter being connected to the actuating end of spring scale 54. Scale 54 is connected to a link 56 which is pivoted to an arm 58 secured to a shaft 60 passing through an opening in the beam member. An arm 62 on the other end of the shaft 60 is pivoted at its end to a thrust link 64 adjustably secured at its other end to a crank arm 66 operating the cam shaft of the brake.

I also prefer to incorporate various adjuncts in my testing apparatus, including a tachometer 68 indicating the R. P. M. of the shaft, and a pyrometer 70, the lead wire mechanism of which is inserted in the center of the brake lining to determine the rise in temperature of the same under test.

In operation, the fly-wheel is given a certain rotational speed to simulate less kinetic energy than that of the average car moving at say twenty miles per hour. The lever 46 simulating, in operation, the service pedal of a car, is then manually actuated by a force indicated by the scale 54 to apply the particular brake under test. The frictional resistance of the brake to the rotation of the drum reacts through one of the anchor pins of the brake to rotate the backing plate and its connected beam arm 34. The scale reading at the end of the arm indicates for this particular apparatus a factor from which the output of the particular brake under test may be computed, the input being determined from the scale reading at 54. The relation of the output to the input, both measured in pounds, gives a value which may be denominated the "effectiveness" of the brake under test.

The brake-applying pressure may be increased as desired by increasing the pressure on the lever 46 and the resulting effect of the brake noted at the scale 38. With relatively high applying pressures, the brake may squeal or grab and the pressures effecting these characteristics are thus noted.

By my novel apparatus the relative effectiveness of various types of brakes may be determined, i. e., a particular two-shoe brake may be compared with a particular three-shoe brake. Various types of brake lining may also be tested on the shoes of one type of brake, various co-efficients of friction being reflected in the scale reading at 38.

The brake may be applied to the rotating drum to only partially absorb its energy or impede its rotation and this is the preferred manner of comparing brakes or linings. Power, however, may be cut off at a certain R. P. M. of the flywheel and the latter decelerated by the brake to an absolute stop. This "stop" test will determine for a given brake the time required and pressure necessary to effect a stopping of the automobile from a certain miles per hour speed. With both tests the output reading at 38 varies somewhat during the brake application, the same being effected both by change in the co-efficient of friction due to heating of the lining and by distortion of the drum by brake application. The former effect may be indicated by the pyrometer previously referred to.

A compact and very effective apparatus is thus provided for comparing merits of various types of brakes and their linings, the relatively few simple parts obviating extensive adjustment and improper functioning.

While several illustrative embodiments have been described in detail, it is not my intention to limit the scope of the invention to those particular embodiments, or otherwise than by the terms of the appended claims.

I claim:

1. A brake testing apparatus comprising a rotatable member, means for rotating the member including a motor, a shaft driven by the motor, and a change speed transmission member connecting parts of the shaft, means on the rotatable member for supporting a drum, a yielding support for a brake unit adaptable for engagement with the drum including an angularly movable plate, a two armed beam member secured to the plate, a weight on one arm of the beam, and a force measuring means connected to the other arm of the beam member.

2. A brake testing apparatus comprising a rotatable fly-wheel, means thereon for supporting a drum, a movable support associated with the fly-wheel adapted to support a brake arranged for cooperation with the drum, a beam secured to the support, a force measuring means secured to one end of the beam, a power transmission linkage for actuating the brake, and a force measuring means connected in the linkage.

3. A brake testing apparatus comprising a rotatable fly-wheel, means thereon for supporting a drum, a pivotal member adjacent the fly-wheel arranged to support a braking element for cooperation with the drum, a beam secured to the member, a force measuring means secured to one end of the beam, and a power transmission linkage for actuating the braking element pivoted in part to the beam, and a force measuring means connected in the linkage.

4. A brake testing apparatus comprising a rotatable fly-wheel, means thereon for supporting a braking flange, a movable member associated with the fly-wheel and arranged to support a braking unit having an actuating cam for cooperation with the braking flange, a beam secured to the member, a force measuring means attached to the beam, a force transmission linkage pivoted to the beam, means connecting the linkage to the actuating cam of the braking unit, and a force measuring means connected in the linkage.

5. A brake testing apparatus comprising a rotatable member, means thereon for supporting a drum, a movable plate adjacent the member arranged to support a friction member for cooperation with the drum, a shaft supporting the plate, a beam secured to the shaft, a force measuring means connected to the beam, means for applying the friction member to the drum, and means for measuring the force required to operate the applying means.

6. A brake testing apparatus comprising a rotatable member thereon for supporting a drum, a plate associated with the rotatable member arranged to support a friction element for cooperation with the drum, a shaft supporting the plate for slight rotation, a beam secured to the shaft, a fixed support, a force measuring means connecting the fixed support to the beam, means for actuating the friction element for engagement with the drum including a force transmitting linkage pivoted in part to the beam, and a force measuring means connected in the linkage.

7. A brake testing apparatus comprising a rotatable flywheel, means thereon for supporting a drum, a movable support associated with the flywheel adapted to support a brake arranged for cooperation with the drum, a beam secured to the support, a force measuring means secured to one end of the beam and a brake-applying power-transmission linkage pivoted in part to the beam, said linkage being so arranged that it may apply the brake without exerting a force tending to rotate the beam.

8. A brake testing apparatus comprising a rotatable flywheel, means thereon for supporting a braking flange, a movable member associated with the flywheel and arranged to support a braking unit having an actuating cam for cooperation with the braking flange, a beam secured to the member, a force measuring means adapted to the beam member, a force transmission linkage pivoted to the beam, and means connecting the linkage to the actuating cam of the braking unit, said connecting means being arranged so that it may apply the brake without exerting the force on the said force measuring means.

GEORGE J. THOMAS.